United States Patent Office 3,520,733
Patented July 14, 1970

3,520,733
PRODUCTION OF GAS DIFFUSION ELECTRODES
Ivor John Buckland, Chalfont St. Peter, and George William Walkiden, South Harrow, England, assignors to The International Nickel Company, Inc., New York, N.Y., a corporation of Delaware
No Drawing. Filed Aug. 16, 1966, Ser. No. 572,700
Claims priority, application Great Britain, Aug. 24, 1965, 36,343/65
Int. Cl. H01m *13/00, 27/00*
U.S. Cl. 136—120
9 Claims

ABSTRACT OF THE DISCLOSURE

Gas diffusion electrodes containing an active metal catalyst such as platinum are produced with a minimum amount of catalyst being used by introducing two fluid phases into the electrode under substantially the pressure and temperature conditions used when the electrode is in operation with one of the liquid phases containing the catalyst metal which is reduced at the three-phase interface created between the introduced phases and the electrode surface under the activating conditions.

---

The present invention is directed to the production of gas diffusion electrodes and, more particularly, to the production of such electrodes wherein an active catalytic mass is effectively introduced therein.

The operation of a fuel cell depends essentially on the ionization of reactants at two electrodes between which there is an electrolyte. Where the reactant is a gas or vapor, a porous electrode known as a gas diffusion electrode is commonly employed. In effect, such an electrode acts as a barrier between the electrolyte and the gaseous reactant while allowing extensive three-phase contact between electrode, electrolyte and reactant. The extent of of this contact determines the rate at which the electrochemical reaction will proceed. The reaction rate may also be increased by the presence of a suitable catalyst and while some electrodes per se exhibit some catalytic activity, it is more common to incorporate a specific, catalytically active material into the electrode.

Similar electrodes are used in the detection and measurement of gases and, broadly, are useful whenever a gas is caused to react electrochemically at a surface on or within an electrode in the presence of an electrolyte.

Some such gas diffusion electrodes are of single porosity throughout, while others are of dual porosity, that is to say, they consist of two layers of material with the pores in one layer finer than those in the other. Triple porosity electrodes consisting of three layers of different pore size are sometimes used.

Now when a catalyst is deposited in the electrode, the processes used are essentially of an impregnation or immersion nature with the result that catalyst is distributed indiscriminately throughout the electrode. By these methods it is difficult to insure that the catalyst is deposited at any specific location in the electrode structure.

Clearly, this manner of depositing the catalyst is wasteful because the electrochemical reaction is localized at, or close to, the three-phase interface between the reactant gas, the liquid electrolyte and the solid electrode, and the catalyst is naturally most usefully deposited only at or close to the site of reaction.

It is an object of the present invention to provide a method for producing gas diffusion electrodes having high efficiency.

It is a further object of the invention to provide gas diffusion electrodes containing an active metal catalyst wherein a minimum amount of catalyst is employed.

Another object of the invention is to provide a method for treating porous conductive plaques to produce therein catalytic masses located internally to provide greatest electrode efficiency.

Other objects and advantages of the invention will become evident from the following description.

The essence of this invention is that catalyst is deposited only where it is most usefully required, and this is done by forming it by interaction between two fluid phases that meet at interfaces within the electrode, the positions of these interfaces being the same or substantially the same as those which exist when the electrode is subsequently used in a fuel cell or otherwise. The phases are advantageously a gas and a liquid, though two substantially immisicible liquids may be used, and at least one of them must consist of or contain a catalyst-forming agent.

The invention is most readily carried out in electrodes of dual porosity, since in these it is easiest to control the position of the interfaces in the electrode.

The invention affords the greatest advantage when applied to electrodes of the nonbubbling type, that is to say, those in which the points of three-phase contact are entirely within the electrodes. Nevertheless, it can be applied to bubbling electrodes, that is to say, those in which much of the reaction takes place at the external surface of the electrode where gas bubbles form. In each case, the interfacial conditions during the deposition of the catalyst are so controlled as to be substantially the same as those during the subsequent use of the electrode.

The liquid and gaseous reagents used to deposit the catalyst may be of any convenient kind but it is highly desirable that the liquid should have no or substantially no reaction with the porous material of the electrode itself. These reagents may be such that what is deposited is not itself the final catalyst, but is converted to the catalyst by further reaction in situ.

The invention is particularly useful in the deposition of catalyst consisting of metals of the platinum group or alloys or mixtures of such metals.

Other catalysts which may be deposited by means of the invention are nickel, silver and cobalt.

The body of the electrode may be of porous metal, for example, porous nickel, porous titanium or porous tantalum or any suitable alloy, for example, stainless steel. Alternatively, the body of the electrode may be of a suitable electrically-conducting nonmetal, for example, porous carbon. Again, it may be of a porous nonconductor bearing a thin electrically-conducting coating, for example, porous polyvinyl chloride bearing a coating of silver.

Some examples will now be given.

EXAMPLE I

Gas diffusion electrodes were made by the method of the invention using as porous material to form the initial electrically conductive plaque a sheet of porous nickel of dual porosity which could be operated as a non-bubbling electrode under a gas pressure from 2.8 to 14 pounds per square inch (p.s.i.). Within this range of gas pressure the gas-liquid interface is at or close to the junction between the two layers within the plaque. The sheet was used with the finer pore layer in contact with a liquid and the coarser pore layer in contact with a gas both when depositing the catalyst and when testing it as an electrode.

As catalyst, platinum was deposited within the porous nickel from an aqueous solution containing 10 grams per liter (g.p.l.) of platinum, in the form of sodium hexa-hydroxy-platinate, and 2 g.p.l. of sodium hydroxide. Samples of the porous nickel were mounted in an apparatus such that the platinum-containing solution was in contact with the fine pore surface, while hydrogen gas at 8.5 p.s.i. pressure, containing a trace of formaldehyde vapor, was in contact with the coarse pore surface of the plaque. Under these conditions, reduction of the platinum compounds by the gas to active platinum took place only at or in the vicinity of the gas-liquid interface. The reaction was allowed to continue for 30 minutes, after which the samples were thoroughly rinsed and dried.

For comparison, platinum catalyst was deposited in similar samples of the same porous nickel by a previously known method in which the samples were impregnated with platinic chloride by immersion in a solution of this compound containing the minimum quantity of hydrochloric acid, and then dried and re-immersed in a 30% aqueous solution of hydrazine at room temperature for 10 minutes. This caused the platinic chloride to be reduced to platinum metal. The samples were then thoroughly rinsed and dried.

Two electrodes produced by each of the methods described were then tested at room temperature in a hydrogen-oxygen fuel cell which contained a 30% aqueous solution of potassium hydroxide as the electrolyte, and in which the operating gas pressure was 8.5 p.s.i. The potential of each electrode with respect to a standard saturated calomel reference electrode (S.C.E.) was measured as a function of the current drawn from the cell and polarization curves were drawn. From these curves the current obtained from the electrode, at a potential of minus 0.4 volt to the S.C.E. for the oxygen electrode and minus 0.8 volt to the S.C.E. for the hydrogen electrode, was obtained. These values indicate the useful output available from the electrode. The results obtained are given in the table below, in which the electrodes Nos. 1 and 2 were prepared according to the invention while electrodes Nos. 3 and 4 were prepared by the previously known method described. The current is expressed in milliamperes per square centimeter (ma./cm.$^2$) and the weight of catalyst deposited is expressed as a percentage of the weight of the porous material of the electrode.

TABLE

| Electrode No. | Platinum content, weight percent | Available current, ma./cm.$^2$ | |
|---|---|---|---|
| | | Hydrogen electrode | Oxygen electrode |
| 1 | 0.28 | 70 | |
| 2 | 0.44 | | 92 |
| 3 | 0.79 | 8 | |
| 4 | 0.72 | | 40 |

The table shows that at both the hydrogen and the oxygen electrode a much increased current output has been obtained using electrodes prepared according to the invention, while at the same time, these electrodes contained a reduced quantity of the expensive platinum metal as compared with electrodes made by the previously known method.

EXAMPLE II

An electrode was made from porous nickel similar to that described in Example I. In this case, however, palladium was deposited as the catalyst from an alkaline solution of sodium pallado-nitrite containing 10 g.p.l. of palladium. The deposition was carried out by mounting the porous nickel in an apparatus so that the palladium-containing solution came into contact with the fine pore surface, while again hydrogen gas at 8.5 p.s.i. pressure, containing a trace of formaldehyde vapor, was brought into contact with the coarse pore surface. Metallic palladium was deposited at the gas-liquid interface. After deposition of the palladium, the samples were thoroughly rinsed and dried.

The electrode thus made was tested as an oxygen electrode in a fuel cell similar to, and operated under the same conditions as, the cell described above. It was found that the available current, evaluated as described in Example I, was 125 ma./cm.$^2$.

Further tests have shown that an active deposit of metallic palladium can be obtained by reaction between an alkaline solution of sodium pallado-nitrite and hydrogen gas, without any formaldehyde vapor being present. The deposit thus obtained is also an efficient catalyst.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for catalytically activating a porous gas diffusion electrode prior to use in a fuel cell which comprises causing two fluid phases at least one of which bears a catalyst-forming metal compound dissolved therein and the other a reducing agent to meet within an electrically conductive porous electrode plaque to form a three-phase interfacial zone with said electrode plaque and interacting said phases substantially at said three-phase zone for a time sufficient to reduce and to deposit catalyst metal on said plaque substantially at said interfacial zone and without depositing catalyst metal substantially elsewhere within said porous electrode plaque, and then using said electrode in a fuel cell for producing electrical energy.

2. A process for catalytically activating a porous gas diffusion electrode prior to use in a fuel cell which comprises impregnating an electrically conductive porous electrode plaque from the liquid side with a solution containing catalytic metal compound while contacting said plaque from the gas side with a reducing gas under a pressure within the operating range and maintaining contact of said solution and said gas at an interface within said electrode for a time sufficient to produce a catalytic metal-containing mass substantially at said interface but without depositing such catalytic metal substantially elsewhere within said porous electrode plaque, and removing said solution from said electrode plaque to provide an active gas diffusion electrode having markedly improved efficiency and then using said electrode in a fuel cell for producing electrical energy.

3. The process according to claim 2 wherein said solution contains a catalytic metal from the group consisting of platinum group metals, nickel, silver and cobalt.

4. The process according to claim 2 wherein the porous plaque is made of a material from the group consisting of nickel, titanium, tantalum, stainless steel, carbon and a porous nonconductor bearing a conductive coating.

5. The process according to claim 2 wherein the porous plaque has a dual porosity, the fine pore side is contacted with solution and the coarser pore side is contacted with reducing gas.

6. The process according to claim 5 wherein the plaque is made of nickel.

7. The process according to claim 6 wherein the solution contains platinum.

8. The process according to claim 6 wherein the solution contains palladium.

9. The process according to claim 6 wherein the reducing gas is hydrogen.

References Cited

UNITED STATES PATENTS

| | | | |
|---|---|---|---|
| 2,328,101 | 8/1943 | Rosenblatt | 117—160 |
| 2,773,844 | 12/1956 | Carlson | 252—447 |
| 3,216,861 | 11/1965 | Cohn | 136—86 |
| 3,291,643 | 12/1966 | Oswin | 136—120 |
| 3,351,487 | 11/1967 | Levine | 117—227 |
| 3,415,686 | 12/1968 | Shropshire | 136—86 |
| 2,716,670 | 8/1955 | Bacon | 136—120 |
| 3,291,753 | 12/1966 | Thompson | 136—86 |
| 3,393,099 | 7/1968 | Giner | 136—86 |

WINSTON A. DOUGLAS, Primary Examiner

P. D. ROSENBERG, Assistant Examiner

U.S. Cl. X.R.

136—86